United States Patent [19]

Thayamballi

[11] Patent Number: 5,385,637
[45] Date of Patent: Jan. 31, 1995

[54] STABILIZING DOMAINS IN INDUCTIVE THIN FILM HEADS

[75] Inventor: Pradeep K. Thayamballi, Fremont, Calif.

[73] Assignee: Read-Rite Corporation, Milpitas, Calif.

[21] Appl. No.: 986,252

[22] Filed: Dec. 7, 1992

[51] Int. Cl.$^6$ .............................................. G11B 5/00
[52] U.S. Cl. .................................... 156/656; 29/603
[58] Field of Search ............... 156/655, 656; 29/603; 360/125, 126, 113

[56] References Cited

U.S. PATENT DOCUMENTS

| | | | |
|---|---|---|---|
| 3,781,476 | 12/1973 | Hanazono et al. | 360/125 X |
| 4,103,315 | 7/1978 | Hempstead et al. | 360/113 X |
| 4,809,109 | 2/1989 | Howard et al. | 360/113 |
| 4,814,921 | 3/1989 | Hamakawa et al. | 360/126 |
| 5,032,945 | 7/1991 | Argyle et al. | 360/126 |
| 5,262,914 | 11/1993 | Chen et al. | 360/113 |

*Primary Examiner*—Thi Dang
*Attorney, Agent, or Firm*—Nathan N. Kallman

[57] ABSTRACT

A method and means for reducing readback non-repeatability in thin film heads due to non-repeatablele domain structure, comprising the steps of depositing a layer of antiferromagnetic material, such as MnFe, to create larger uniaxial anisotropy, and localizing such a layer in the upper magnetic pole to improve head performance without sacrificing efficiency. In a particular implementation, alternating layers of NiFe/MnFe/NiFe, each 500 Angstroms thick, are deposited, followed by a sputtered seed layer for subsequent plating. After lapping to correct throat height, the head is then heated above the Neel temperature of MnFe and cooled in the presence of an applied magnetic field.

5 Claims, 1 Drawing Sheet

STABILIZING DOMAINS IN INDUCTIVE THIN FILM HEADS

FIELD OF THE INVENTION

This invention relates to magnetic recording heads and in particular to thin film magnetic transducers employing high permeability magnetic films for pole pieces and magnetic shields, or other thin films.

DESCRIPTION OF THE PRIOR ART

Thin film magnetic recording devices of small physical size, as reviewed, for example by Chynoweth and Kaiser, AIP Conference Proceedings 24, p. 534–540 (1974) and by Thompson, AIP Conference Proceedings 24, p. 528–533 (1974) show the effect of individual magnetic domains in response to electrical and magnetic excitation. The strength of the magnetic field required to force a magnetic film of a predetermined thickness to comprise a single magnetic domain increases approximately inversely as the linear dimensions of a structure are decreased. The latter is a demagnetizing effect which ensures that an isolated magnetic of a few hundred microns in diameter or less will contain several domains if it has a thickness of a few microns or less. When bias field sufficiently strong to saturate the material into a single magnetic domain is applied to a film, the result is that the effective permeability is reduced to a uselessly low value. One way to overcome the problem of low effective permeability would be to make a multilayer structure of thin films if one were able to alternate the direction of the bias field from one layer to the next, since then a much smaller magnitude of bias field would be required.

It has been known that deposition of a sandwich of manganese (Mn) and nickel-iron (NiFe) layers with one layer each can sustain a magnetic bias field in the NiFe film by annealing in a magnetic field at a temperature of 300° (See Salanski et al, "Stabilization of Microdomain Configurations in Two-Layer Magnetic Films," Sov. Phys.-JETP, Vol 38, No. 5, May 1974, p. 1011 et seq). U.S. Pat. No. 3,840,898 to Bajorek et al for a "Self-Biased Magnetoresistive Sensor" teaches that a hard magnetic bias can be provided by exchange coupling between two layers if there is direct atomic contact between the layers in a magnetic recording magnetoresistive sensor. An antiferromagnetic material such as $\alpha Fe_2O_3$ is deposited on a glass substrate followed by deposition of NiFe by evaporation in a strong magnetic field to produce a magnetically hard composite film having a permeability of 20 or less. Glazer et al in "Stabilization of the Ferromagnetic Domain Structure in Thin Films with Exchange Anisotropy", Phys. Metals and Metallography (USSR) 26 #2, pp. 103–110 (1968) teaches stabilization of 1,000 Angstrom thick 82:18 NiFe films with a 1,000 Angstrom thick manganese layer below it as the films cool through the Neel temperature following "spraying" onto a substrate. The film was demagnetized and then annealed for 1½ hours at 350° C. The exchange coupling leads to stabilization of the domain structure.

Glazer et al in "Exchange Anisotropy in Thin Magnetic Films," Soviet Physics-Solid State, Vol. 8, No. 10, pp 2413–2420 discuss vacuum deposition of a 450 Angstrom thick manganese layer, followed by a 800 Angstrom thick NiFe 82:18 layer which had uniaxial anisotropy following deposition. It was annealed in a magnetic field of 140 Oersteds (Oe) along the easy axis at 350° Centigrade for 30 minutes and cooled to room temperature in the furnace with the magnetic field still applied. The purpose of annealing was to form an antiferromagnetic layer by mutual interdiffusion.

Massenet et al in "Magnetic Properties of Multilayer Films of Ni—Mn—NiCo and of NiMn," IEEE Trans Magnetics, MAG-1, 63–65 (1965) teach exchange coupling between an Mn film and an Ni film in an Ni—Mn—NiCo structure with NiFe 81:19 and for an Mn layer thinner than 150 Angstroms with coupling between the magnetization of the Ni and NiCo layers. The films were prepared by evaporation in a continuous magnetic field with the easy directions of magnetization parallel in the various layers and heated to 280° C., presumably to cause interdiffusion of Mn and Ni to form an antiferromagnetic layer. Such exchange coupling is also referred to in J. S. Kouvel, J. Phys. Chem. Solids, 24, 529 (1963).

In another approach, disclosed in U.S. Pat. No. 4,103,315, the domain walls are minimized by a multiple thin film structure including at least one pair of layers of a ferromagnetic material and an antiferromagnetic material deposited one upon one another, that are exchange coupled to retain a unidirectional bias in the plane of the ferromagnetic material. If multiple pairs of layers are used, a layer of nonmagnetic material is provided to separate the pairs. The successive pairs of layers have their unidirectional bias pointing in opposite direction. However, if the bias is strong, rotational permeability and head efficiency are reduced. If the bias is weak, domain walls are not completely eliminated and the films exhibit Barkhausen noise. This general patent covers the use of MnFe as a domain stabilizing agent in inductive heads. The use of MnFe is over both poles (see FIG. 5) and does not specify where an exchange layer should be localized in order to improve head performance.

U.S. Pat. No. 5,032,945, by Argyle et al., provides for a "layer of antiferromagnetic material deposited between the non-magnetic layer and one of the magnetic layers to provide additional anisotropy". While utilizing the general idea of domain stabilization, the structure is not localized, and reduces head efficiency. U.S. Pat. No. 4,814,921 by Hamakawa et al addresses the use of multilayered films, however, the use of localized antiferromagnetic structure is not addressed.

SUMMARY OF THE INVENTION

The present invention is directed to a magnetic thin film structure using an antiferromagnetic layer, such as MnFe, in selective areas of the inductive thin film head, to stabilize domain structures. The exchange layer is localized in order to improve head performance, both in terms of readback stability, as well as head efficiency. The MnFe layer is buried in the top pole of the head, eliminating corrosion problems.

To provide the exchange biased antiferromagnetic structure, the antiferromagnetic layer may be deposited in several ways. It may be deposited over an entire area and subsequently configured as desired, as by etching. Also, it may be applied by a lift-off process. The antiferromagnetic structure consists of a sandwich of NiFe/MnFe/NiFe films all deposited in the same run. Subsequently, a uniform seed layer may be sputter deposited thereon for use as a plating base.

BRIEF DESCRIPTION OF THE DRAWING

The invention will be described in detail with reference to the drawing in which the sole Figure is a cross-sectional view of a thin film recording head incorporating an antiferromagnetic layer in accordance with this invention.

DETAILED DESCRIPTION OF THE INVENTION

Figure 1:
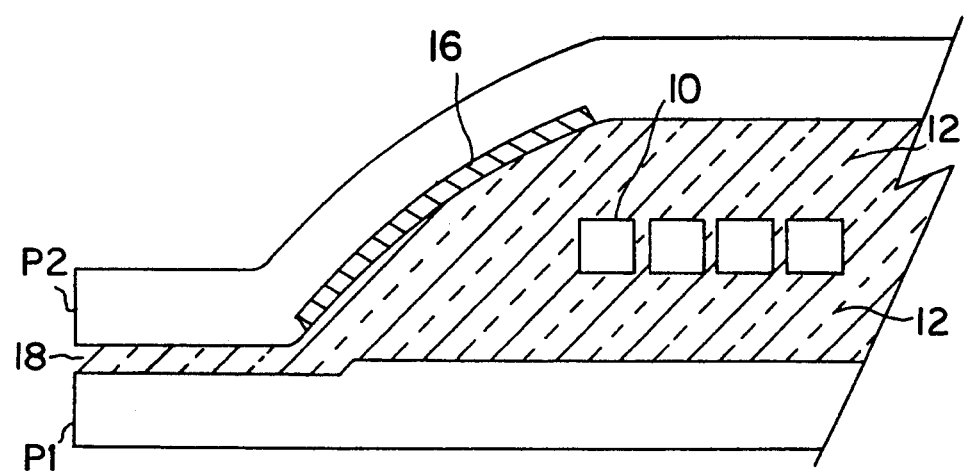

In keeping with this invention, an antiferromagnetic layer such as MnFe is used to stabilize domains in inductive thin film heads. A thin layer of MnFe is deposited in a specified area of the thin film head in contact with the upper magnetic pole layer designated as P2. The purpose of the MnFe layer is to create larger uniaxial anisotropy where required, to control domain structures. Thus, thin film head readback nonrepeatability due to non-repeatable domain structures, mainly on the P2 layer, is eliminated or reduced.

Referring to the drawing, a typical thin film magnetic recording head is partly shown in cross-section. The head comprises an upper or top Permalloy pole layer P2 and a lower Permalloy pole layer P1 that form a magnetic yoke and a magnet path. The top P2 layer converges from the yoke region of the thin film head structure to a sloping nose area and then to a pole tip region where the P1 and P2 pole tips define a transducing gap 18 therebetween. An electrical coil 10 is formed between the magnetic Permalloy pole layers P1 and P2. Insulation material 12 encompasses the coil 10 to isolate the coil 10 from the Permalloy to prevent electrical shorting. The thin film structure is supported by a substrate (not shown).

In keeping with this invention, a thin film layer 16 is deposited along a portion of the P2 pole layer. The thin film structure of this invention incorporates the layer 16 as a sandwich structure including thin films of 500 Angstroms (A°) each of NiFe, MnFe and NiFe alternately all deposited in the same production run. After deposition, the sandwich layer 16 may be etched to conform to the nose area of the P2 top pole layer. As shown in FIG. 1, the nose area is the area where the top P2 pole layer slopes and converges from the head yoke region towards the pole tip region where the P1 and P2 pole tips define the transducing gap 18. The sandwich layer 16 may also be applied utilizing well known lift-off techniques. A uniform seed layer is then sputter deposited to serve as a plating base for the P2 pole layer. The anisotropy in the exchange coupled films can be established at any subsequent process by raising the head temperature to above the Neel temperature of MnFe and applying a uniaxial field along the derived easy axis. This serves to lock the domains along the easy axis. The MnFe is preferably limited to the nose area so that the permeability in the flat portion of the magnetic head yoke is not compromised.

The thin film head structure disclosed herein using a sandwich layer of NiFe/MnFe/NiFe thin films provides stabilization of domains by creating a larger uniaxial anisotropy. The required uniaxial anisotropy may be introduced by annealing in a field after the head is lapped to its final configuration. This ensures proper domain behavior which may have been changed by the lapping stresses.

What is claimed is:

1. A method of stabilizing a magnetic thin film recording head structure having a substrate for supporting a lower magnetic pole layer, an upper top magnetic pole layer for forming a magnetic yoke with said lower pole layer, said pole layers characterized by an easy axis of magnetization, said top pole layer including a sloping nose area narrowing from said magnetic yoke, an electrical coil layer formed between said pole layers, and insulation encompassing said coil layer, wherein said layers are deposited as thin films, comprising the steps of:

depositing a sandwich of NiFe/MnFe/NiFe thin films in a selected localized area of said head structure adjacent to said nose area prior to the deposition of said upper top magnetic pole layer;

configuring said deposited sandwich to conform to said sloping nose area of said top pole layer;

depositing a seed layer upon said deposited sandwich for serving as a base for subsequent plating;

raising the temperature of said thin film recording structure above the Neel temperature of MnFe and applying a uniaxial magnetic field along said easy axis of magnetization of said pole layers;

cooling said head structure to room temperature in the presence of said uniaxial magnetic field.

2. The method of claim 1, wherein said deposited sandwich is applied by sputtering and said configuring step comprises an etching process.

3. The method of claim 1, wherein said sandwich is deposited in a selected localized area of said head structure by lift-off techniques.

4. The method of claim 1, wherein said deposited sandwich is applied by thin film evaporation.

5. The method of claim 1, wherein said deposited sandwich comprises alternating material layers of approximately 500 Å in thickness.

* * * * *